United States Patent
Watanabe

(10) Patent No.: US 11,721,930 B2
(45) Date of Patent: Aug. 8, 2023

(54) WIRE HARNESS

(71) Applicant: Yazaki Corporation, Tokyo (JP)

(72) Inventor: Jin Watanabe, Makinohara (JP)

(73) Assignee: YAZAKI CORPORATION, Minato-ku (JP)

(*) Notice: Subject to any disclaimer, the term of this patent is extended or adjusted under 35 U.S.C. 154(b) by 379 days.

(21) Appl. No.: 17/120,474

(22) Filed: Dec. 14, 2020

(65) Prior Publication Data

US 2021/0226375 A1    Jul. 22, 2021

(30) Foreign Application Priority Data

Jan. 17, 2020 (JP) ................. 2020-006208

(51) Int. Cl.
| | | |
|---|---|---|
| *H01R 13/516* | (2006.01) | |
| *H01B 7/00* | (2006.01) | |
| *H01B 7/24* | (2006.01) | |
| *H01R 13/72* | (2006.01) | |
| *H01R 13/73* | (2006.01) | |

(52) U.S. Cl.
CPC ......... *H01R 13/516* (2013.01); *H01B 7/0045* (2013.01); *H01B 7/24* (2013.01); *H01R 13/72* (2013.01); *H01B 7/009* (2013.01); *H01R 13/73* (2013.01)

(58) Field of Classification Search
CPC ...... H01R 13/516; H01B 7/0045; H01B 7/07; H01B 7/24; H01B 13/72
USPC ....................................... 439/501
See application file for complete search history.

(56) References Cited

U.S. PATENT DOCUMENTS

| | | | | |
|---|---|---|---|---|
| 6,376,768 B1* | 4/2002 | Saito | ................. | B60R 16/0215 220/3.7 |
| 7,118,410 B2* | 10/2006 | Hatori | ................. | H01R 9/2416 439/501 |
| 8,304,653 B2* | 11/2012 | Suzuki | ................ | B60R 16/0215 174/72 A |
| 9,481,327 B2* | 11/2016 | Shibata | ................. | H02G 3/083 |
| 9,659,688 B2* | 5/2017 | Yamaguchi | ............ | H01B 17/06 |

(Continued)

FOREIGN PATENT DOCUMENTS

| | | |
|---|---|---|
| JP | 2000-92649 A | 3/2000 |
| JP | 2004-273369 A | 9/2004 |

(Continued)

*Primary Examiner* — Alexander Gilman
(74) *Attorney, Agent, or Firm* — Sughrue Mion, PLLC

(57) ABSTRACT

A wire harness includes: a wire bundle that bundles electric wires, the wire bundle including a branch portion; and a protector attached to the wire bundle so as to accommodate the branch portion of the wire bundle. The wire bundle includes: branch lines extending from the branch portion in routing directions; and a relay line drawn out from the branch portion, the relay line being provided with a connector at a tip end. The protector includes: accommodating portions that accommodate the branch lines, respectively; and connector holding portions provided in at least two of the accommodating portions, respectively, the connector holding portions being provided within a range where the relay line reaches from the branch portion. The relay line is accommodated in the protector in a state in which the connector is selectively held in one of the connector holding portions.

5 Claims, 5 Drawing Sheets

(56) References Cited

U.S. PATENT DOCUMENTS

| | | | |
|---|---|---|---|
| 2003/0006057 A1* | 1/2003 | Ito | B60R 16/0215 |
| | | | 174/68.3 |
| 2005/0106934 A1* | 5/2005 | Hatori | H01R 13/5833 |
| | | | 439/501 |
| 2011/0120747 A1* | 5/2011 | Muneyasu | B60R 16/0207 |
| | | | 174/113 R |
| 2013/0146353 A1 | 6/2013 | Shimada | |
| 2013/0146354 A1 | 6/2013 | Shimada | |
| 2013/0180777 A1* | 7/2013 | Shibata | H02G 3/02 |
| | | | 174/72 A |
| 2017/0057434 A1 | 3/2017 | Nohara et al. | |

FOREIGN PATENT DOCUMENTS

| | | |
|---|---|---|
| JP | 2010-27242 A | 2/2010 |
| JP | 2012-55056 A | 3/2012 |
| JP | 2012-55058 A | 3/2012 |
| JP | 2013-225981 A | 10/2013 |
| JP | 2015-230873 A | 12/2015 |

\* cited by examiner

WIRE HARNESS

CROSS-REFERENCE TO RELATED APPLICATIONS

This application is based on and claims priority of Japanese Patent Application No. 2020-006208 filed on Jan. 17, 2020, the enter contents of which are incorporated herein by reference.

FIELD

One or more aspects of the present invention relate to a wire harness including a wire bundle and a protector.

BACKGROUND

A wire harness mounted on a vehicle such as an automobile is generally configured as an assembly obtained by bundling, for example, a plurality of sub-harnesses prepared for each system. Generally, the plurality of sub-harnesses are individually prepared so as to correspond to specifications required for the wire harness.

Examples of the specifications described above include a wide variety of electrical components mounted on the vehicle to correspond to various optional accessories (for example, a sound system and a power window system) selected in accordance with a type and a grade of the vehicle and a demand of a user (driver). Each of these electrical components has a different form of electric wire such as a required power supply line, ground line, signal line, and communication line. In order to operate optional equipment to be selectively mounted, a sub-harness that collects selectively provided electric wires (selected electric wires) is also referred to as an optional sub-harness. On the other hand, in order to operate a device such as an engine and a motor that are commonly mounted regardless of the type of the vehicle or the like, a sub-harness that collects electric wires provided as standard (standard electric wires) is also referred to as a standard sub-harness (for example, see JP-A-2015-230873).

SUMMARY

In recent years, application of information technology to vehicles such as automatic driving technology and external environment detection technology is rapidly advancing. As the number and types of electrical components mounted on a vehicle increase with an introduction of IT in such vehicles, the number and types of sub-harnesses required to form a wire harness also tend to increase. For example, even when the same electrical component is mounted on the vehicle, if a mounting position of the electrical component differs due to a difference in a specification of the vehicle or the like, a length of the sub-harness for operating the electrical component is different. At this time, if the sub-harness having an appropriate length is not used, when the length is excessively short, it is not possible to connect the sub-harness to the electrical component in the first place, and when the length is excessively long, there is a possibility that problems such as an extra length of an electric wire coming into contact with a peripheral member and the contact with the peripheral member causing abnormal noise may occur. On the other hand, from a viewpoint of actually manufacturing the wire harness, rather than individually preparing sub-harnesses of various lengths, it is desirable to reduce types of the sub-harnesses while satisfying a performance required for the wire harness and eliminating the problems.

One or more aspects of the present invention have been made in view of the above circumstances, and an object thereof is to provide a wire harness which can appropriately absorb an extra length of a sub-harness at the time of routing without excessively increasing a type of the sub-harness.

An aspect of the present invention provides a wire harness including: a wire bundle that bundles a plurality of electric wires, the wire bundle including a branch portion; and a protector attached to the wire bundle so as to accommodate the branch portion of the wire bundle, wherein the wire bundle includes: a plurality of branch lines extending from the branch portion in a plurality of routing directions; and a relay line drawn out from the branch portion, the relay line being provided with a connector at a tip end, wherein the protector includes: a plurality of accommodating portions that accommodate the plurality of branch lines, respectively; and a plurality of connector holding portions provided in at least two of the plurality of accommodating portions, respectively, the plurality of connector holding portions being provided within a range where the relay line reaches from the branch portion, and wherein the relay line is accommodated in the protector in a state in which the connector is selectively held in one of the plurality of connector holding portions.

According to one or more aspects of the present invention, it is possible to provide a wire harness which can appropriately absorb an extra length of a sub-harness at the time of routing without excessively increasing a type of the sub-harness.

The one or more aspects of the present invention have been briefly described as above. Further, details of one or more aspects of the present invention will be clarified by reading a mode (hereinafter, referred to as "embodiment") for carrying out the one or more aspects of the invention to be described below with reference to accompanying drawings.

DETAILED DESCRIPTION

Figure 1:
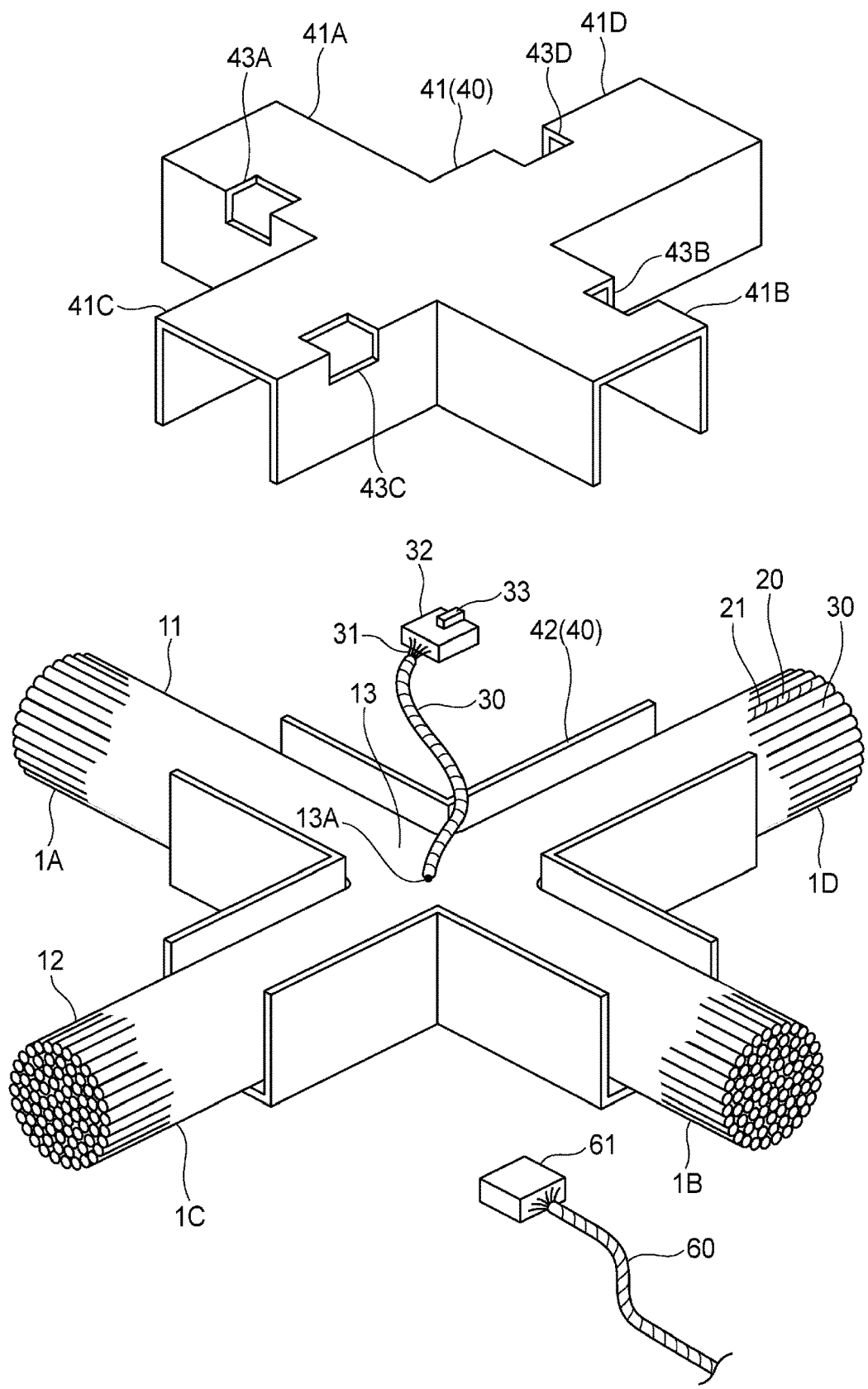
FIG. 1 is an exploded perspective view of a wire harness according to an embodiment of the present invention.
Figure 2:
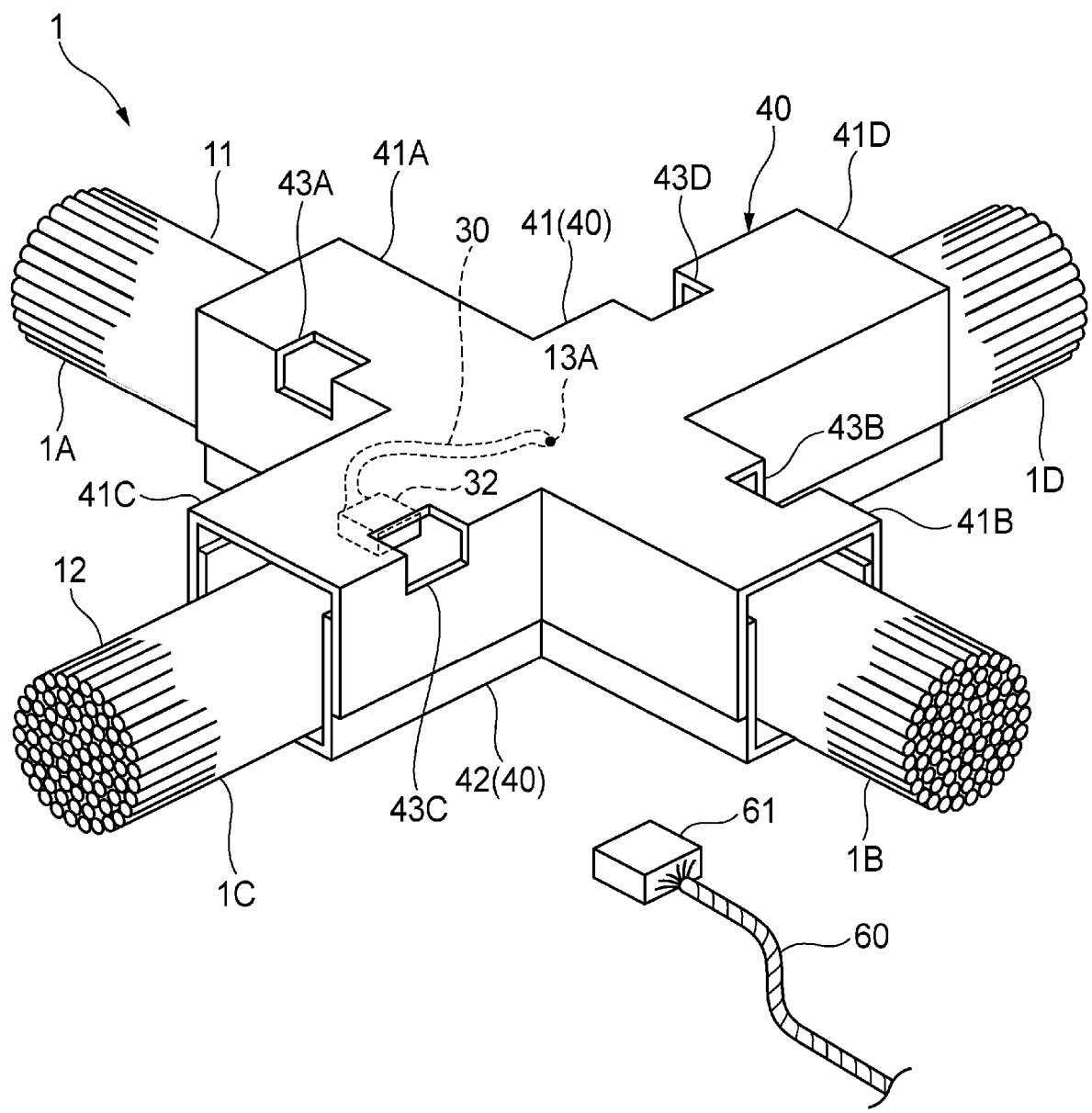
FIG. 2 is a perspective view showing the wire harness after assembly.

A wire harness according to embodiments of the present invention will be described below with reference to the drawings.

<Overall Configuration of Wire Harness>

A wire harness 1 according to an embodiment of the present invention will be described with reference to FIGS. 1 to 4. First, an overall configuration of the wire harness 1 will be described.

The wire harness 1 of the present embodiment is mounted on a vehicle such as an automobile. The wire harness 1 includes first and second trunk lines 11, 12 disposed on a vehicle body, and a protector 40 having a lid 41 and a body 42 and sandwiching the first and second trunk lines 11, 12 from an upper-lower direction of the vehicle for protection.

The first trunk line 11 of the wire harness 1 is routed to extend, for example, in a front-rear direction of the vehicle on the vehicle body. The second trunk line 12 of the wire harness 1 intersects the first trunk line 11 substantially at a right angle and extends and routes, for example, in a left-right (width) direction of the vehicle. That is, the wire harness 1 of the present embodiment is routed in a substantially cross shape as a whole, and includes a branch portion 13 at which the first and second trunk lines 11, 12 intersect and branch. The branch portion 13 of the wire harness 1, the branch portion 13 and a periphery thereof are covered and protected by the protector 40.

A portion of the first trunk line 11 located on a vehicle front side is referred to as a front side portion 1A of the wire harness 1 with reference to the branch portion 13 of the wire harness 1. Similarly, a portion thereof located on a vehicle rear side is referred to as a rear side portion 1B of the wire harness 1. A portion of the second trunk line 12 located on a vehicle left side is referred to as a left side portion 1C of the wire harness 1, and a portion thereof located on a vehicle right side is referred to as a right side portion 1D of the wire harness 1.

The wire harness 1 includes a standard sub-harness 20 implemented by a plurality of standard circuit lines 21, and an optional sub-harness 30 implemented by a plurality of selection circuit lines 31. The standard sub-harness 20 and the optional sub-harness 30 are integrally bundled in each of the first and second trunk lines 11, 12 of the wire harness 1, and the first and second trunk lines 11, 12 are configured as an assembly including these sub-harnesses 20, 30.

In the branch portion 13 of the wire harness 1, one of the optional sub-harnesses 30 is drawn out from the first trunk line 11 or the second trunk line 12 so as to extend from a branch point 13A of the branch portion 13. A harness-side connector 32 to be locked to a protector-side locking portion 44 of the protector 40 to be described later is provided at a tip end portion of the optional sub-harness 30 drawn out from the branch portion 13.

The harness-side connector 32 is a male connector, and is formed in a flat box shape by an insulating synthetic resin or the like. The selection circuit lines 31 of the optional sub-harness 30 are connected to a side face on one end of the harness-side connector 32.

The lid 41 of the protector 40 is configured to cover one face of the body 42 that is open above the vehicle. The lid 41 and the body 42 of the protector 40 are made of an insulating synthetic resin or the like. As described later, the body 42 accommodates the first and second trunk lines 11, 12 at a bottom therein as described later. By covering the lid 41 with the body 42, the protector 40 accommodates and protects the first and second trunk lines 11, 12 therein. The lid 41 of the protector 40 is detachably provided to the body 42. Maintenance or replacement can be appropriately performed on the first and second trunk lines 11, 12 by removing the lid 41.

Figure 3:
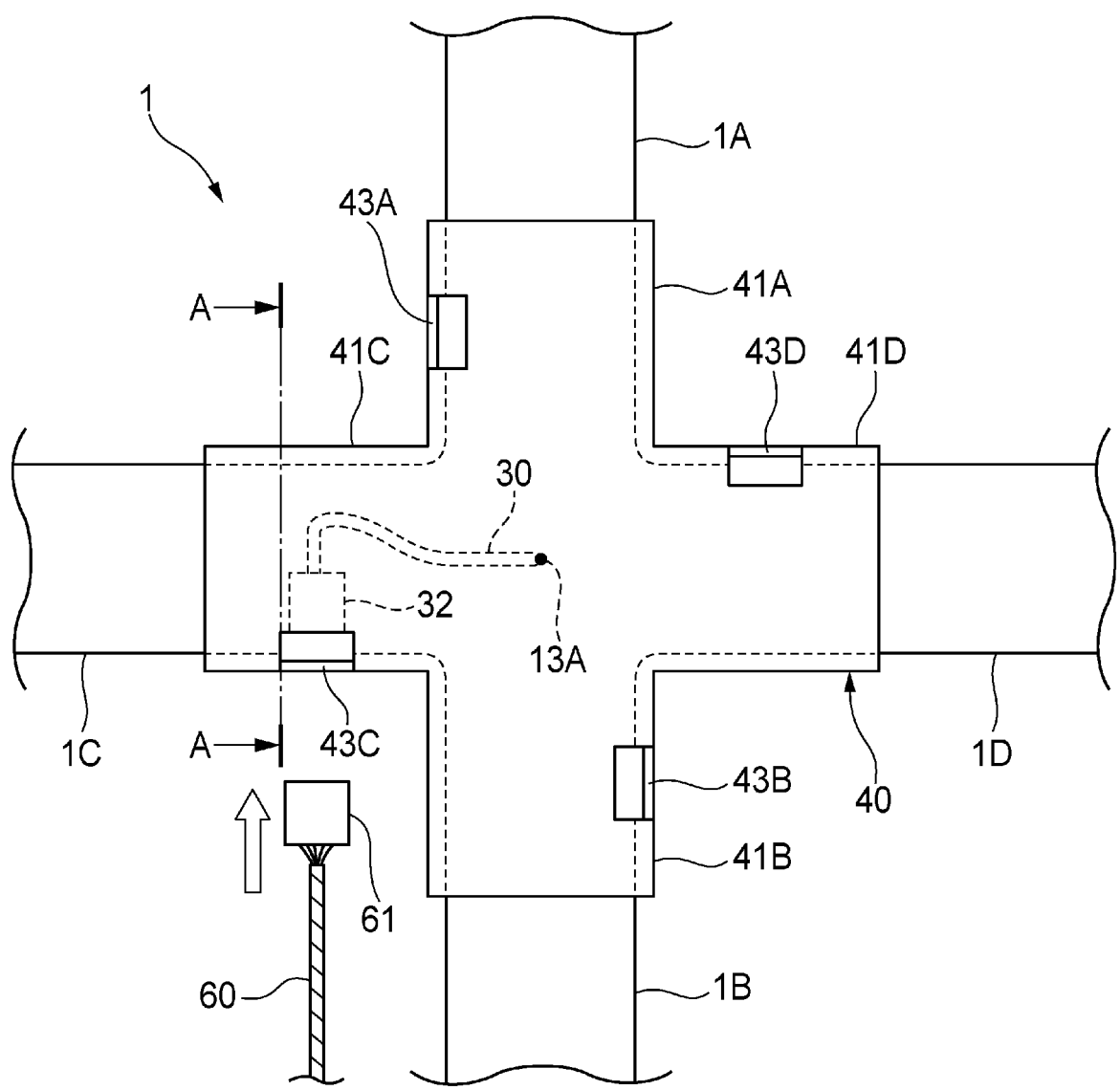
FIG. 3 is a top view of a protector shown in FIG. 2.

The lid 41 includes an accommodating portion 41A located on the vehicle front side, an accommodating portion 41B located on the vehicle rear side, an accommodating portion 41C located on the vehicle left side, and an accommodating portion 41D located on the vehicle right side so as to correspond to the front side portion 1A, the rear side portion 1B, the left side portion 1C, and the right side portion 1D of the wire harness 1 extending around the branch portion 13. Through holes 43A to 43D communicating with an inside and outside of the lid 41 are provided in the accommodating portions 41A to 41D, respectively. As shown in FIG. 3, the through holes 43A to 43D are disposed at point-symmetrical portions centered on the branch point 13A at which the sub-harness 30 branches.

Figure 4:
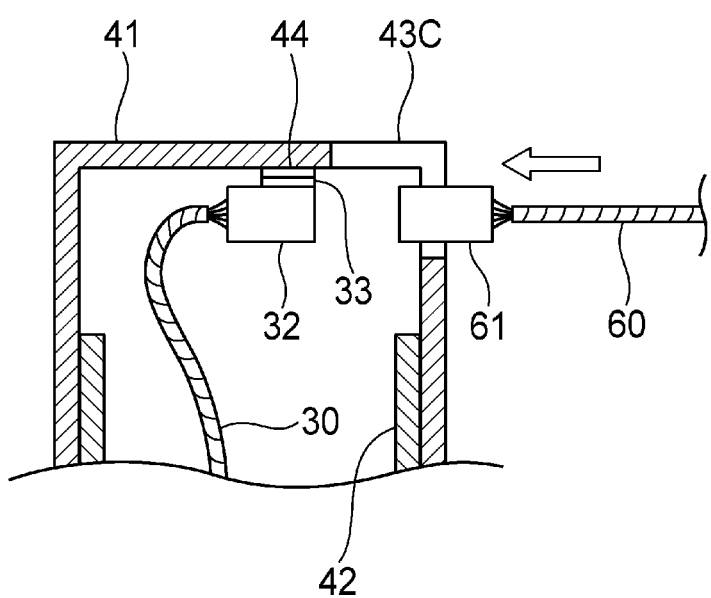
FIG. 4 is a cross-sectional view taken along a line A-A of FIG. 3.

As shown in a cross-sectional view of FIG. 4, an inner wall of the lid 41 around the through hole 43C is provided with the protector-side locking portion 44 for locking the harness-side connector 32. The protector-side locking portion 44 has a structure capable of locking with a locking portion 33 of the harness-side connector 32, and holds the harness-side connector 32 in a posture facing an outside of the through hole 43C. Also in the other through holes 43A, 43B, and 43D, similar protector-side locking portion 44 is provided so that the harness-side connector 32 can be similarly held with respect to any of the through holes 43A, 43B, and 43D.

An external connector 61 of an external sub-harness 60 extending from a predetermined electrical component (not shown) is fitted into the harness-side connector 32 held thus through the through hole 43C from an outside of the protector 40. Accordingly, the external sub-harness 60 is connected to the sub-harness 30 included in the first and second trunk lines 11, 12.

Here, if the through holes 43A to 43D for exposing the harness-side connector 32 are selected according to an extra length of the external sub-harness 60, the extra length of the external sub-harness 60 can be absorbed without changing a length of the optional sub-harness 30 and a length of the external sub-harness 60 itself. Thus, the wire harness 1 can absorb the extra length of an electric wire (the external sub-harness 60) at the time of routing while satisfying a performance required for the wire harness 1.

Other Embodiments

The present invention is not limited to the above-described embodiment and various modifications can be used within the scope of the present invention. For example, the present invention is not limited to the above-described embodiment, and may be appropriately modified, improved or the like. In addition, materials, shapes, dimensions, numbers, arrangement positions or the like of elements in the embodiment described above are optional and not limited as long as the present invention can be achieved.

Figure 5:
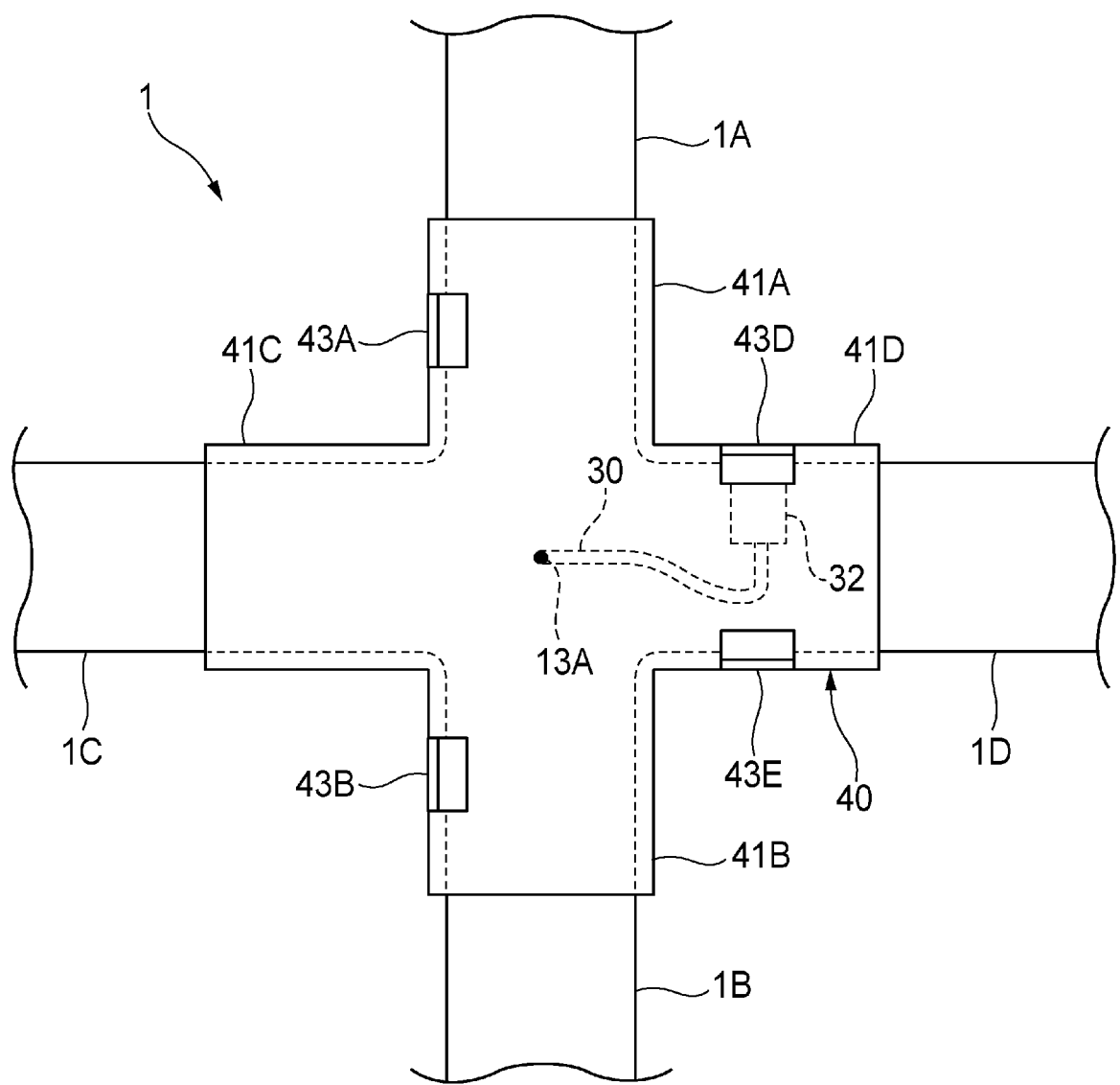
FIG. 5 is a view corresponding to FIG. 3 showing the wire harness according to another embodiment of the present invention.

For example, as shown in FIG. 5, some of through holes 43D and 43E may be disposed at line-symmetrical portions about an axis of the accommodating portion 41D. Even with such a line-symmetrical arrangement, the extra length of the external sub-harness 60 can be absorbed without changing the length of the optional sub-harness 30 and the length of the external sub-harness 60 itself.

Here, the wire harness 1 according to embodiments of the present invention described above are briefly summarized in the following configurations [1] to [3].

[1] A wire harness (1) including:
  a wire bundle (11, 12) that bundles a plurality of electric wires, the wire bundle including a branch portion (13); and
  a protector (40) attached to the wire bundle (11, 12) so as to accommodate the branch portion (13) of the wire bundle (11, 12),
  wherein the wire bundle (11, 12) includes:
    a plurality of branch lines (11, 12) extending from the branch portion (13) in a plurality of routing directions; and
    a relay line (30) drawn out from the branch portion (13), the relay line (30) being provided with a connector at a tip end,
  wherein the protector (40) includes:

a plurality of accommodating portions (41A to 41D) that accommodate the plurality of branch lines (11, 12), respectively; and a plurality of connector holding portions (43A to 43E, 44) provided in each of at least two of the plurality of accommodating portions (41A to 41D), respectively, the plurality of connector holding portions (43A to 43E, 44) being provided within a range where the relay line (30) reaches from the branch portion (13), and wherein the relay line (30) is accommodated in the protector (40) in a state in which the connector is selectively held in one of the plurality of connector holding portions (43A to 43E, 44).

[2] The wire harness (1) according to [1], wherein the plurality of connector holding portions (43A to 43D, 44) are disposed at point-symmetrical portions around the branch portion (13).

[3] The wire harness (1) according to [1] or [2], wherein the plurality of connector holding portions (43D, 43E, 44) are disposed at line-symmetrical portions about an axis of one (41D) of the plurality of accommodating portions.

According to the wire harness of the above-described configuration [1], the connector of the relay line can be held by the connector holding portion provided in each of the accommodating portions of the protector without changing a length of the relay line drawn out from the branch portion of the wire bundle. Therefore, for example, by selecting the connector holding portion that holds the connector of the relay line in accordance with an extra length of the sub-harness extending from an external device, an extra length of an external sub-harness can be appropriately absorbed without changing a length of the relay line or the external sub-harness. Therefore, the wire harness of the present configuration can appropriately absorb the extra length of the sub-harness at the time of routing without excessively increasing a type of the sub-harness.

According to the wire harness of the above-described configuration [2] or [3], it is possible to hold the connector of the branch line at the connector holding portion without changing the length of the relay line drawn out from the branch portion by disposing the plurality of connector holding portions at point-symmetrical portions or line-symmetrical portions on the protector.

The invention claimed is:

1. A wire harness comprising:
   a wire bundle that bundles a plurality of electric wires, the wire bundle comprising a branch portion; and
   a protector attached to the wire bundle so as to accommodate the branch portion of the wire bundle,
   wherein the wire bundle comprises:
      a plurality of branch lines extending from the branch portion in a plurality of routing directions; and
      a relay line drawn out from the branch portion, the relay line being provided with a connector at a tip end,
   wherein the protector comprises:
      a plurality of accommodating portions that accommodate the plurality of branch lines, respectively; and
      a plurality of connector holding portions provided in at least two of the plurality of accommodating portions, respectively, the plurality of connector holding portions being provided within a range where the relay line reaches from the branch portion, and
   wherein the relay line is accommodated in the protector in a state in which the connector is selectively held in only one of the plurality of connector holding portions.

2. The wire harness according to claim 1,
   wherein the plurality of connector holding portions are disposed at point-symmetrical portions around the branch portion.

3. The wire harness according to claim 1,
   wherein the plurality of connector holding portions are disposed at line-symmetrical portions about an axis of one of the plurality of accommodating portions.

4. The wire harness according to claim 1, wherein
   the connector comprises a terminal of the relay line,
   the terminal is configured to be electrically connected to another connector via a direct connection between the connector and the another connector, and
   the connector and the terminal are entirely held within the one of the plurality of connector holding portions.

5. The wire harness according to claim 4,
   wherein a portion of the connector at which the terminal is located is directly fixed to an inner wall of the one of the plurality of connector holding portions.

\* \* \* \* \*